(12) United States Patent
Nasuto et al.

(10) Patent No.: US 7,933,988 B2
(45) Date of Patent: Apr. 26, 2011

(54) METHOD AND SYSTEM FOR MONITORING PERFORMANCE OF A CLIENT-SERVER ARCHITECTURE

(75) Inventors: Antonio Nasuto, Turin (IT); Giuseppe Cassone, Turin (IT); Danilo Gotta, Turin (IT)

(73) Assignee: Telecom Italia S.p.A., Milan (IT)

( * ) Notice: Subject to any disclaimer, the term of this patent is extended or adjusted under 35 U.S.C. 154(b) by 454 days.

(21) Appl. No.: 11/665,798

(22) PCT Filed: Oct. 20, 2004

(86) PCT No.: PCT/EP2004/011868
§ 371 (c)(1),
(2), (4) Date: Apr. 19, 2007

(87) PCT Pub. No.: WO2006/045522
PCT Pub. Date: May 4, 2006

(65) Prior Publication Data
US 2008/0104230 A1    May 1, 2008

(51) Int. Cl.
*G06F 15/173* (2006.01)
*H04W 4/00* (2009.01)

(52) U.S. Cl. ........................................ 709/224; 370/328

(58) Field of Classification Search .................. None
See application file for complete search history.

(56) References Cited

U.S. PATENT DOCUMENTS

| | | | |
|---|---|---|---|
| 6,006,260 A | 12/1999 | Barrick, Jr. et al. | |
| 6,411,998 B1 | 6/2002 | Bryant et al. | |
| 6,449,739 B1 | 9/2002 | Landan | |
| 6,973,489 B1 * | 12/2005 | Levy | 709/224 |
| 2003/0055883 A1 | 3/2003 | Wiles, Jr. | |
| 2003/0131052 A1 | 7/2003 | Allan | |
| 2003/0195960 A1 * | 10/2003 | Merriam | 709/224 |
| 2006/0029016 A1 * | 2/2006 | Peles | 370/328 |
| 2009/0006616 A1 * | 1/2009 | Gore et al. | 709/224 |

FOREIGN PATENT DOCUMENTS

WO  WO-01/20918 A2  3/2001

OTHER PUBLICATIONS

Alfano et al.; "Web Log Analysis for Performance Troubleshooting"; Euro CMG Proceedings, pp. 1/13-13/13, Jun. 2002.

* cited by examiner

*Primary Examiner* — Wen-Tai Lin
(74) *Attorney, Agent, or Firm* — Finnegan, Henderson, Farabow, Garrett & Dunner, L.L.P.

(57) ABSTRACT

An arrangement which jointly exploits an agent component installed in a server-side portion of client-server architecture for emulating requests of actual clients of the client-server architecture and measuring a server execution time indicative of a time elapsed between reception of an emulated end-user request at a server component and generation of a result of said emulated end-user request at said server component; information stored in a server log file about a hit end to end response time, i.e., the time elapsed between the instant in which the end-user sends a request to the server component and the instant in which result of the request reaches the end-user. From the server execution time and the hit response time, the delay due to the network connecting the server-side portion of the client-server architecture to a client-side portion may be determined. The network delay and the server execution time are then used for monitoring performance of the client-server architecture by distinguishing network related problems from server-related problems or even from client-related problems.

13 Claims, 6 Drawing Sheets

METHOD AND SYSTEM FOR MONITORING PERFORMANCE OF A CLIENT-SERVER ARCHITECTURE

CROSS REFERENCE TO RELATED APPLICATION

This application is a national phase application based on PCT/EP2004/011868, filed Oct. 20, 2004, the content of which is incorporated herein by reference.

FIELD OF THE INVENTION

The invention relates to techniques for monitoring performance of a client-server architecture. More particularly, the present invention relates to a method and system for monitoring the operation of a client-server architecture including a web-based or other transactional servers.

DESCRIPTION OF THE RELATED ART

Different approaches exist for assisting companies in testing the performance and functionality of their web-based transactional servers and associated applications.

Document US 2003-0131052 describes a method, system, apparatus, and computer program product for collecting time-on-page statistics. When a server receives a request for a Web page, the server generates or retrieves the Web page and then instruments the Web page to collect time-on-page metrics by inserting a script into the Web page, after which the Web page is returned to the requesting client. The browser processes the Web page and interprets the embedded script; the script defines a function that is evaluated when the browser determines to load a different Web page. The browser then presents the Web page, but when the Web page is unloaded, the function is invoked; the function computes a time value that represents the amount of time that the browser has presented the Web page. The function then returns to the server the computed time value as a time-on-page metric value.

Document U.S. Pat. No. 6,449,739 describes a monitoring system which allows users to monitor the post-deployment performance of a web-based or other transactional server. The system includes an agent component ("agent") which can be installed on computers ("agent computers") that have access to the transactional server, including computers of actual users of the transactional server. The agent simulates the actions of actual users of the transactional server while monitoring the server's performance. The specific transactions to be performed by the agent computers are specified by testcases that are dispatched to the agent computers using a controller component ("controller"). As each agent computer executes a testcase, it reports the execution results (performance data) in real-time to a web-based reports server which stores the results in a centralized database. Authorized personnel can access the reports server using a standard web browser to view the collected performance data via a series of customizable reports.

Additionally, document U.S. Pat. No. 6,411,998 describes a method of determining Internet delays associated with requests from a Web client connectable to a Web server. The method begins at the Web server in response to a first HTTP request. In particular, the Web server serves a response to the first HTTP request and logs a server processing time associated with serving that response. After the response is delivered back to the Web client that initiated the request, an end user response time associated with the first HTTP request is calculated at the Web client. Upon a new HTTP request (typically the next one), the end user response time associated with the first HTTP request is then passed from the Web client to the Web server in a cookie. The Internet delay associated with the first HTTP request is then calculated by subtracting the server processing time from the end user response time.

Further, in the paper "Web log analysis for performance troubleshooting", EuroCMG-2002 Proceedings, June 2002, a Web Performance Log Analysis (WPLA) activity is described which makes possible to extract a suite of useful information for performance analysis from the log file of a web server. Web server logs can be configured to record an optional value that is very useful for performance analysis, i.e. the Time-Taken field which measures the time taken from the instant in which the server starts to manage the request until the reception of the last byte is confirmed by the client. The authors have found that the value stored in the Time-Taken field is a good approximation of the time each user waits for execution of each hit (i.e. the hit end to end response time).

OBJECT AND SUMMARY OF THE INVENTION

Applicant has observed that a problem exists of monitoring performance of a client-server architecture (for example in terms of server execution time and end to end response time) by distinguishing network-related problems from server-related problems or even from client-related problems.

Applicant has further observed that another problem exists of monitoring performance of a client-sever architecture by avoiding:
installation of client-side agent;
modification in the code of end-user requests; and
addition of network traffic.

Essentially, the Applicant has found that these problems may be solved by an arrangement which jointly exploits:
an agent component, installed in a server-side portion of the client-server architecture, for emulating requests of actual clients of the client-server architecture and measuring a server execution time indicative of a time elapsed between reception of an emulated end-user request (also called hit) at a server component and generation of a result of said emulated end-user request at said server component;
information stored in a server log file about a hit end to end (e2e) response time i.e. the time elapsed between the instant in which an end-user sends a request to the server component and the instant in which result of the request reaches the end-user;

From the server execution time and the hit e2e response time, the delay due to the network connecting the server-side portion of the client-server architecture to a client-side portion may be determined. The network delay and the server execution time are then used for monitoring performance of the client-server architecture by distinguishing network-related problems from server-related problems or even from client-related problems.

The Applicant has determined, among others, that by emulating requests of actual clients in an agent component located near the server component and measuring the server execution time based on the actual response provided by the server component to the agent component, it is possible to monitor the server execution performance in a non intrusive way, i.e., without changing the server component software.

More specifically, the Applicant has found that this problem can be solved by means of a method for monitoring performance of a client-server architecture comprising a client-side portion and a server-side portion connected together via a network, said client-side portion including at least one end-user terminal and said server-side portion including at least a server component, the method comprising the steps of:

emulating and sending to said serves component at least one end-user terminal request by means of an agent component installed in said server-side portion;

processing at said server component said at least one emulated request and generating a corresponding result;

measuring a server execution time indicative of the time elapsed between reception of said emulated end-user request at said server component and generation of a result of said emulated end-user request at said server component;

extracting from a log file, maintained in said server component, entries comprising an item indicative of a hit e2e response time elapsed between the end-user terminal sent a request to said server component and result of said request reaching said end-user terminal;

determining for said at least one emulated request a network delay introduced by the network from said server execution time and said hit e2e response time.

Another aspect of the present invention relates to a system for monitoring performance of a client-server architecture comprising a client-side portion and a server-side portion connected together via a network, said client-side portion including at least one end-user terminal and said server-side portion including at least a server component, the system comprising:

at least an agent component, installed in said server-side portion, said agent component being configured for:

emulating and sending to said server component at least one end-user terminal request, said at least one emulated request being processing at said server component for generating a corresponding result;

measuring a server execution time indicative of the time elapsed between reception of said emulated end-user request at said server component and generation of a result of said emulated end-user request at said server component;

at least a log extractor configured to produce with said server component a log file including entries comprising an item indicative of a hit e2e response time elapsed between the end-user terminal sent a request to said server component and result of said request reaching said end-user terminal;

at least a controller configured for:

determining for said at least one emulated request a network delay introduced by the network) from said server execution time and said hit e2e response time.

According to a further another aspect of the present invention there is provided a method for monitoring performance of a client-server architecture comprising a client-side portion and a server-side portion connected together via a network, said client-side portion including at least one end-user terminal and said server-side portion including at least a server component, the method comprising the steps of:

sending to said server component at least one end-user terminal request;

processing at said server component said at least one request and generating a corresponding result;

measuring by means of an agent component installed in said server-side portion a server execution time indicative of the time elapsed between reception of said end-user request at said server component and generation of a result of said end-user request at said server component;

extracting from a log file, maintained in said server component, entries comprising an item indicative of a hit e2e response time elapsed between the end-user terminal sent a request to said server component and result of said request reaching said end-user terminal;

determining for said at least one request a network delay introduced by the network from said server execution time and said hit e2e response time.

In an additional aspect of the present invention there is provided a system for monitoring performance of a client-server architecture comprising a client-side portion and a server-side portion connected together via a network (10), said client-side portion (1a) including at least one end-user terminal (20) and said server-side portion (1b) including at least a server component (40a), the system comprising:

at least an agent component (70a), installed in said server-side portion (1b), said agent component (70a) being configured for:

sending to said server component (40a) at least one end-user terminal request, said at least one end-user terminal request being processing at said server component (40a) for generating a corresponding result;

measuring a server execution time (Te) indicative of the time elapsed between reception of said end-user request at said server component (40a) and generation of a result of said end-user request at said server component (40a);

at least a log extractor (70b) configured to produce with said server component (40a) a log file including entries comprising an item (124) indicative of a hit e2e response time (208) elapsed between the end-user terminal (20) sent a request to said server component (40a) and result of said request reaching said end-user terminal (20);

at least a controller (70c) configured for:

determining for said at least one request a network delay (Tn) introduced by the network (10) from said server execution time (Te) and said hit e2e response time (208).

Further aspects of the present invention relate to a client-server architecture including such a system, and a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

Further preferred aspects of the present invention are described in the dependent claims and in the following description.

BRIEF DESCRIPTION OF THE ANNEXED DRAWINGS

The invention will now be described, by way of example only, with reference to the enclosed figures of drawing, wherein.

DETAILED DESCRIPTION OF PREFERRED EMBODIMENTS OF THE INVENTION

The following description sets forth numerous implementation-specific details of a monitoring system and associated method. These details are provided in order to illustrate a preferred embodiment of the invention, and do not limit the scope of the invention.

Throughout this description, it will be assumed that the transactional server being monitored is a web-based system that is accessible via the Internet. It will be recognized, however, that the inventive method can also be used to monitor other types of transactional servers, including those that use proprietary protocols or are accessible only to internal users of a particular organization.

Figure 1:
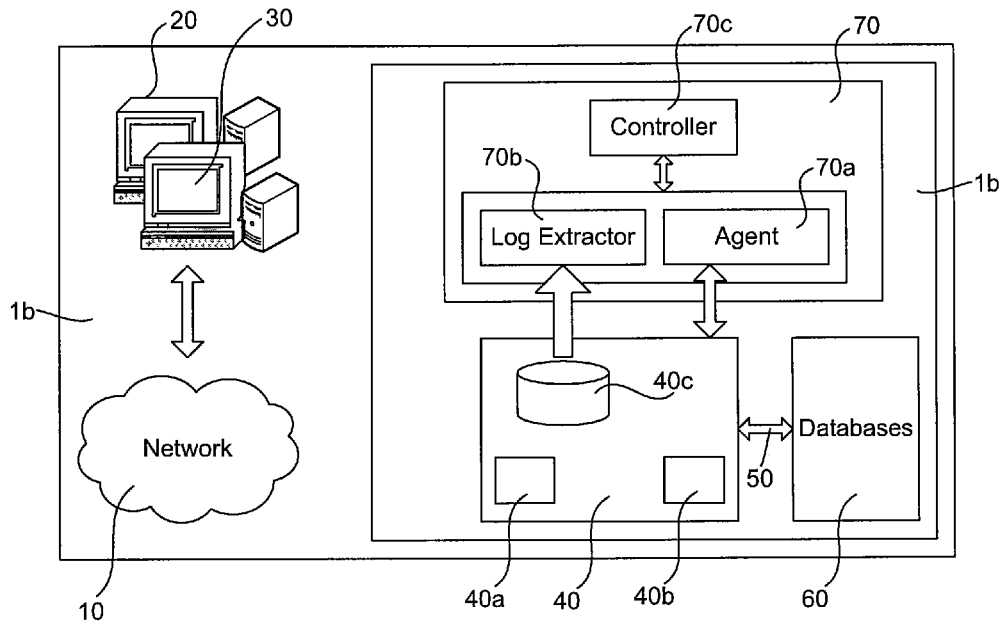
FIG. 1 shows the framework of an embodiment of the invention described herein.

FIG. 1 shows an exemplary embodiment of a client-server architecture 1 including a client-side portion 1a and a server-side portion 1b connected together via a first network 10, i.e. the Internet.

The client-side portion 1a comprises at least one, typically a plurality of end-user terminals 20, such as for example personal computers, personal digital assistants (PDAs), wireless phones, etc. Each end-user terminal 20 supports a respective web browser 30 (representative browsers can include, among others, Microsoft® Internet Explorer, Netscape® Navigator, or the like).

In a preferred embodiment of the present invention, the server-side portion 1b comprises a transactional server 40 connected via a second network 50 (for example a LAN) to back-end databases, represented in FIG. 1 with a single block referenced as 60.

For the purposes of the present description, the term "transactional server" refers to a system which responds to requests from at least a user to perform one or more tasks or "transaction" such as viewing account information, placing an order, performing a search, viewing and sending electronic mail, downloading data from a web portal (for example mp3 file, video, etc.).

As shown in FIG. 1, the transactional server 40 can include a web server component 40a and one or more application servers 40b. The application servers 40b may, for example, provide functionalities for implementing one or more business processes, such as setting up a user account, placing an order, etc. The application servers 40b typically provide user access to one or more of the back-end databases 60.

Figure 2:
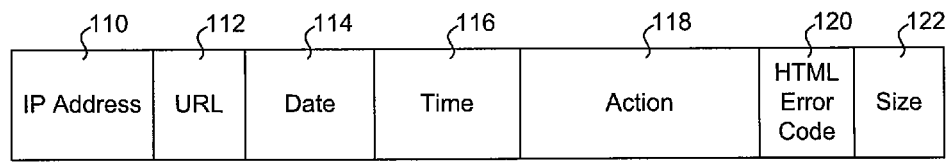
FIG. 2 shows an example of a web server log file format.

The web server component 40a includes a web server log file 40c in which the web server component 40a stores every request (also called hit) associated to a web page received by end-user terminals 20 in such a way that every entry of the web sever log file 40c refers to a single hit. Since a web page is made of a plurality of "objects" (such as text, pictures, script-code, etc.), several subsequent requests, each associated to a single object, are sent to the web server component 40a until the web page is completely downloaded. This means that the operation of downloading a web page generates more than one entry on the web server log file 40c. Standard common formats exist for web server log files. An exemplary format, shown in FIG. 2, can comprise, for every entry, the following fields:

IP address 110,
URL (if logged) 112,
Date 114,
Time 116,
Action (usually a GET or POST action) 118,
Html Error Code 120, and
Size 122.

Figure 3:
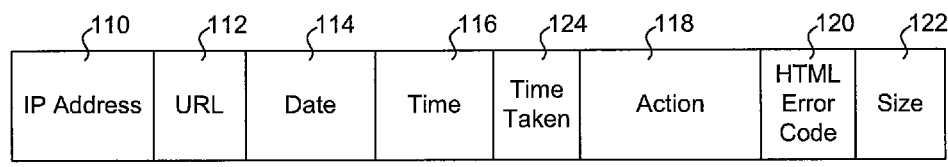
FIG. 3 shows another example of a web server log file format.

With reference to FIG. 3, through a modification in its configuration file, the web server component 40a can be customized to add a further field, referred to as Time Taken field 124, to every entry of the web server log file 40c. As will be better described in the following, the value stored into the Time Taken field 124 is a very good approximation of the hit e2e response time i.e. the time elapsed between the instant in which an end-user terminal 20 sends a request to the web server component 40a and the instant in which the result of the request reaches the end-user terminal 20.

Back to FIG. 1, a system 70 for monitoring performance of the client-server architecture 1 is associated to the transactional server 40.

In detail, the system 70 includes at least an agent component 70a, a log extractor 70b and a controller 70c.

In detail, the agent component 70a is a module that, according to the present invention, is adapted to be installed on a host computer (or otherwise, for complex architectures, on other network element like reverse-proxies) which is located in the server-side portion 1b, near the web server component 40a.

By the expression "near" it is here meant that the host computer where the agent component 70° is run has a high speed (and/or dedicated) link with the web server component 40a so that, independently from the physical distance between the two computers, information can be exchanged between them with a constant and short delay, preferably of less than 50 ms.

Alternatively, the agent component 70a can be installed directly on the web server component 40a.

The agent component 70a includes the basic functionalities of emulating requests of actual end-users terminals 20 of the transactional server 40 and, for each emulated request of measuring a server execution time, i.e. the time elapsed between the instant in which the agent component 70a sends the emulated request to said web server component (40a) and the instant in which the agent component (70a) receives the result of the emulated request.

Since the agent component 70a is located near the web server component 40a, the server execution time measured by the agent component 70a is not affected by the network delay, so this server execution time is substantially equal to the real server execution time i.e. the time elapsed between reception of an end-user terminal request at the web server component (40a) and generation of a result of the end-user terminal request at the web server component (40a).

For the purpose of the present description by the expression "substantially equal" in the above sentence, it is to be intended that the difference between the server execution time measured by the agent component 70a and the real server execution time is below 50 ms.

In a preferred embodiment of the present invention, the agent component 70a is based on the so-called "record & playback" paradigm.

Specifically, a web browser of the same type of that installed on each end-user terminals 20, is run on the host computer to emulate a sequence of requests sent to the web server component 40a by the actual end-users terminals 20 of the transactional server 40.

The sequence of requests to be emulated by the agent component 70a can be selected by the controller 70c using criteria that will be better described in the following.

The agent component 70a records, for example in a script, every request emulated by the web browser installed on the host computer. Then this script is used to play back the recorded requests at the beginning of the monitoring process. The script can also be manually modified by the agent administrator to generalize its parameters. When the agent component 70a "playsback" the script, it also measures and records, in a memory (for example the hard disk) of the host computer, the server execution time associated to each emulated request.

The log extractor 70b is a module able to read and extract the fields stored in the web server log file 40c. Specifically, for each request received from the end-user terminals 20, the log extractor 70b extracts from the web server log file 40c a subset of fields such as: IP ADDRESS, DATE, TIME, URL, ERROR CODE, DIMENSION (Size) and TIME-TAKEN.

As already mentioned above, the value stored into the Time Taken field 124 is a very good approximation of the hit e2e response time i.e. the time elapsed between the instant in which an end-user terminal 20 sends a request to the web server component 40a and the instant in which the result of the request reaches the end-user terminal 20.

Figure 4:
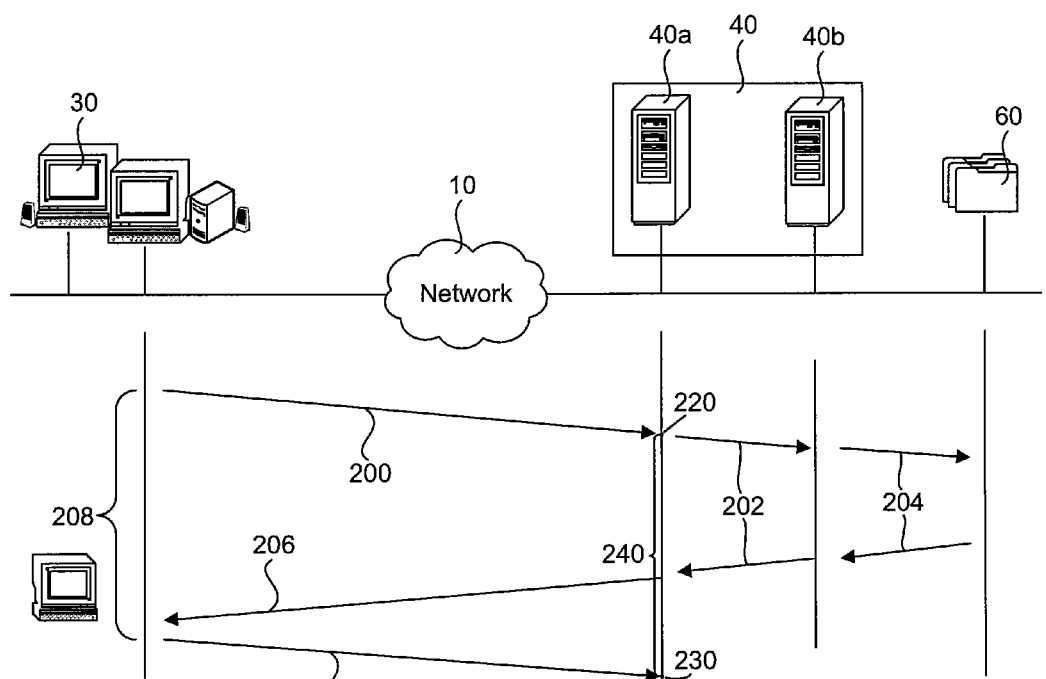
FIG. 4 is a simplified timing diagram illustrating how the relationship between the hit e2e response time and the time taken field of the web server log file is calculated.

In order to facilitate understanding of what said above, in FIG. 4 a time diagram is illustrated where:

reference 200 identifies the time ($GET_t$) taken by a request generated from the end-user terminal 20 to reach the web server component 40a;

reference 202 identifies the sum of the times (WEB SERVER$_t$) taken for the request to possibly propagate from the web server component 40a to one of the application server 40b, and for the retrieved result to propagate back from the application server 40b to the web server component 40a, respectively;

reference 204 identifies the sum of the times ($BACKEND_t$) taken for the request to reach the source of the result requested (e.g. one of the back-end databases 60) from the application server 40b and the time taken for the retrieved result to reach the application server 40b from the back-end database 60, the sum of the times 202 and 204 corresponding to the real server execution time;

reference 206 identifies the time ($DOWNLOAD_t$) taken for the retrieved result in order to reach the end-user terminal 20 from the web server component 40a;

reference 208 designates the hit e2e response time ($HIT_{e2e}$). Specifically, the hit e2e response time, is given by the formula: $HIT_{e2e}=GET_t=WEB\ SERVER_t+BACKEND_t+DOWNLOAD_t$; and reference 210 designates the time ($ACK_t$) requested for the acknowledgement from the end-user terminal 20 to reach the web server component 40a. The acknowledgement is sent by the end-user terminal 20 after having successfully downloaded the result sent by the web server component 40a.

Further, the time-taken 240 is the elapsed time since the request is received by the web server component 40a and until the web server component 40a receives from the end-user terminal 20, an acknowledgement related to the fact that the result of such request has reached the end-user terminal 20. In particular, reference 220 designates the start operation to evaluate the time-taken, and reference 230 designates the stop operation. Specifically, the formula describing the time taken is:

$$TIME\ TAKEN=WEB\ SERVER_t+BACKEND_t+DOWNLOAD_t+ACK_t$$

The difference between the time taken and the hit e2e response time 208 is:

$$TIME\ TAKEN-HIT_{e2e}=GET_t-ACK_t$$

As both the GET and the ACK operation are simple short messages going from the end-user terminal 20 to the web server component 40a, they are very likely to follow the same (or nearly the same) route and to take a similar time to reach the destination. The consequence is that:

$$GET_t \approx ACK_t$$

and so $$TIME\ TAKEN-HIT_{e2e} \approx 0 \Rightarrow TIME\ TAKEN \approx HIT_{e2e}$$

i.e the value stored in the Time-Taken field 124 is a good approximation of the hit e2e response time 208.

Again with reference to FIG. 1, the controller 70c is an engine that manages the other two components 70a, 70b, by configuring their behavior, and also collects and processes data from these two components 70a, 70b, to characterize the performance of the client-server architecture 1. The controller 70c also includes a management console for configuration of the two other components 70a, 70b, essentially in terms of data collection scheduling. Specifically, this management console is able to analyze the subset of fields extracted from the web server log file 40c through the log extractor 40b and, on the basis of this analysis, to communicate to the agent component 70a the sequence of requests to be emulated. Specifically, if a request has certain characteristics and it is not already emulated by the agent component 70a, then this request is selected to be added in an agent list and then emulated.

Preferably, the controller 70c chooses the requests (hits) to be emulated using the following criteria:

size of the hit (e.g. in terms of bytes): for example, the controller 70c may select hits with a size higher than 30 KB because it is likely that they have higher hit e2e response times amplifying possible network bottlenecks. In fact, these hits are usually slower in transmission producing a big impact on the network delays;

processing time: hits with a high time value stored in the Time-Taken field 124, for example $\geq 8$ s, are more likely to have high server response times, so they are selected by the controller 70c; and hits not found in the cache of the web server component 40a.

On the contrary, hits found in the cache of the web server component 40a may be excluded by the controller 70c since their server execution time is not significant.

Choosing the requests to be emulated is an initial step taken by the controller 70c to start up the measurements of the agent component 70a, but it is also a scheduled periodical activity (as example, once a week) performed by the controller 70c, in order to track changes in user access, server modification and so on. The transactional server administrator can also select the requests to be emulated or add other relevant request to the agent list.

The size of the agent list is typically kept limited, to avoid a high computational burden on the web server component 40a that has to process the emulated requests. To this end, each time a new relevant request is added to the agent list, a less relevant request is removed. The size of the agent list can be defined, e.g., by the server administrator, for each specific case. For example, the agent list can comprise a number of requests between 10 and 20, typically chosen among those associated with the most requested web pages or with other pages deemed to be significant by the server administrator.

Successively, the controller 70c interrogates the agent component 70a and the log extractor 70b to collect, for each emulated request, the server execution time Te measured by the agent component 70a during play back of its script, and the Time Taken field 124 extracted from the web server log file 40c. The controller 70c interrogates the agent component 70a and the log extractor 70b with a sampling period defined by the transactional server administrator (for example every minute). The data obtained by the agent component 70a and the log extractor 70b are then processed to determine for each emulated request, the network time Tn i.e. the time taken from the first network 10 to transmit the request from the web server component 40a to the end-user terminal 20. For a long distance connection, this time can strongly affect the hit e2e response time 208. In general network time grows/raises according to:

dimension (in byte) of the hit (the bigger the hit, the longer the delay);

speed of connection (the quicker the connection, the shorter the delay).

Specifically, for each emulated request, the network time Tn can be calculated by subtracting the server execution time Te measured by the agent component 70a from the hit e2e response time 208 stored in the Time Taken field 124.

Figure 5:
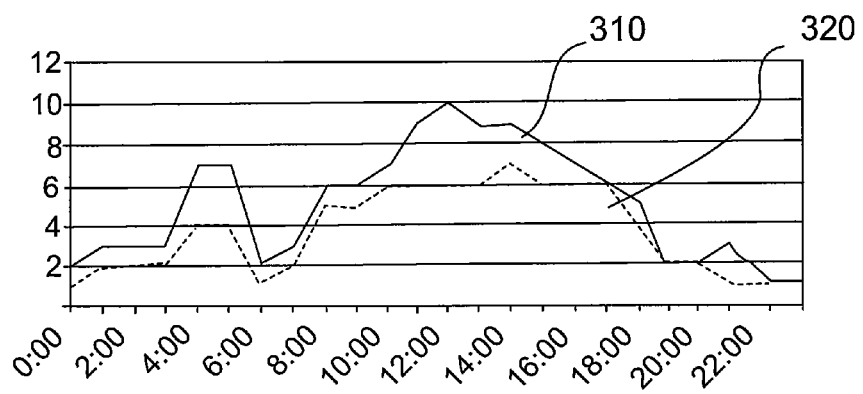
FIG. 5 shows an example of hit e2e response time, network time and server execution time versus time.

This is graphically explained in FIG. 5. In detail, the network time Tn is the area between the two curves, designated with the reference numbers 310 and 320, that are exemplary of possible time behaviors of the hit e2e response time 208 and the server execution time Te, respectively, over one day (hours in the abscise scale).

For example, for a given IP address, day and hit, the controller 70c can determine, over one hour, the average network time Tn as the average of all the Time-Taken fields 124 extracted by the log extractor 70b in that hour minus the average of all the server execution times Te measured by the agent component 70a in the same hour.

Figure 6:
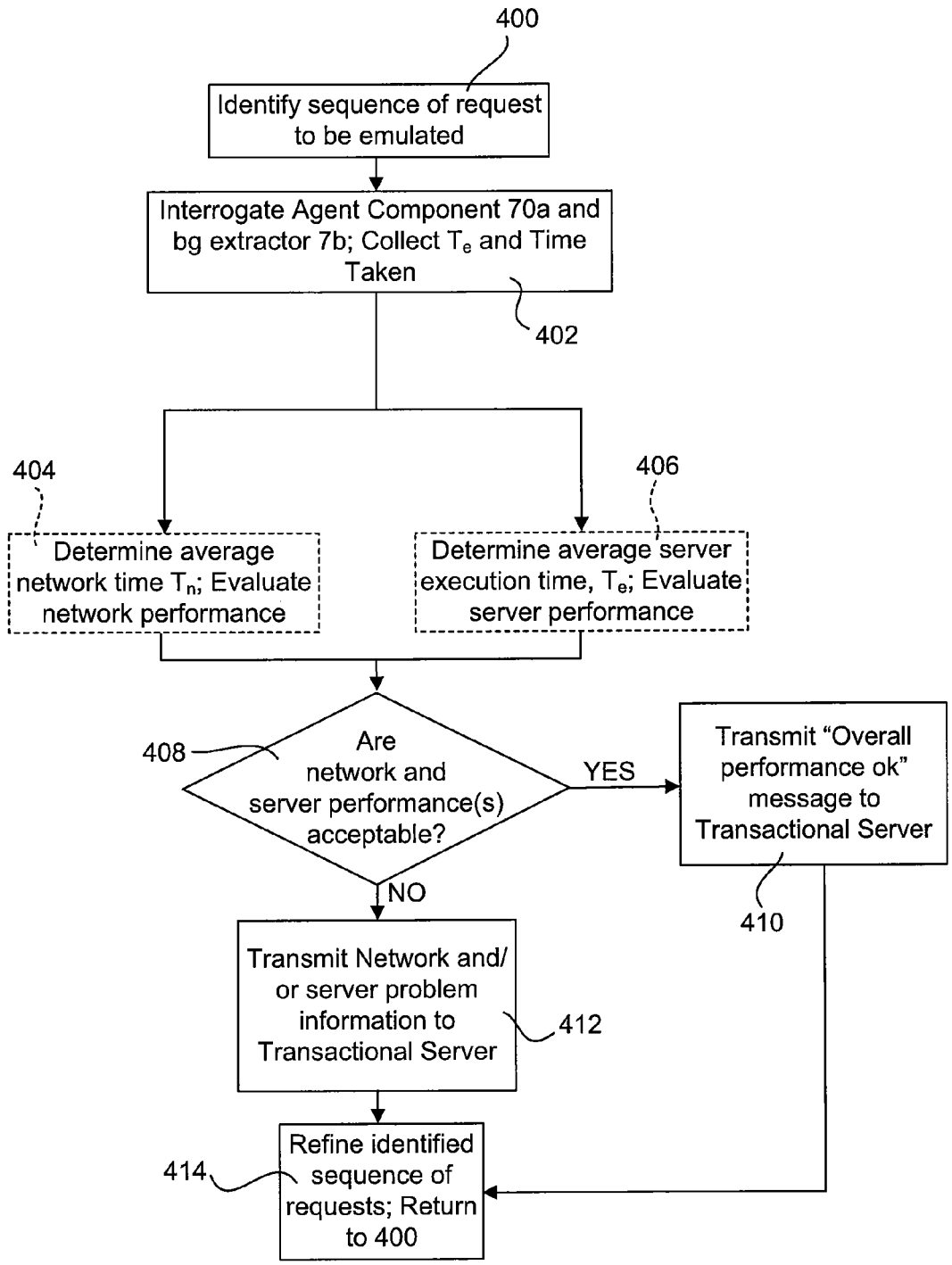
FIG. 6 is a flow chart of the monitoring method used by the invention described herein.
Figure 7:
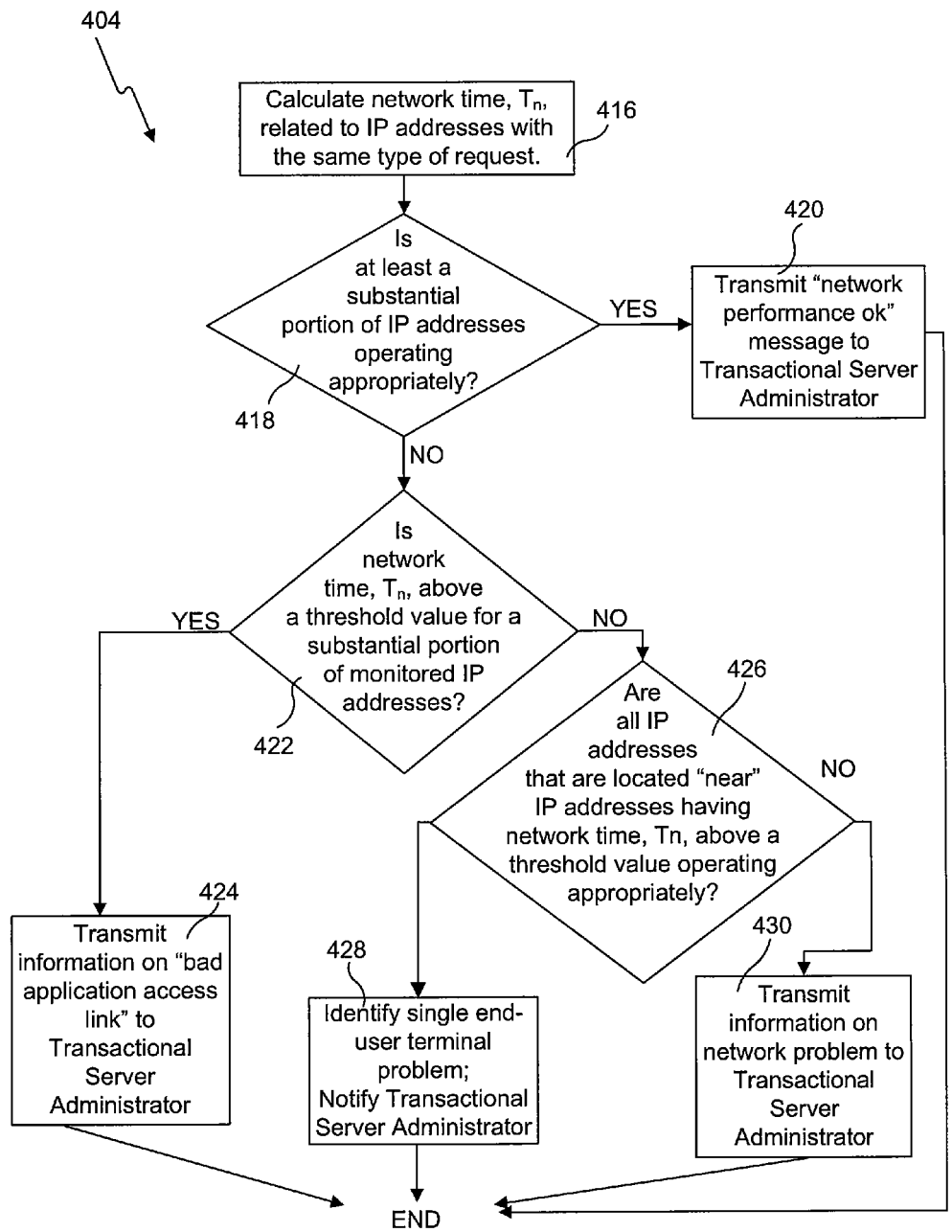
FIG. 7 is a flow chart of a part of the monitoring method of FIG. 6.
Figure 8:
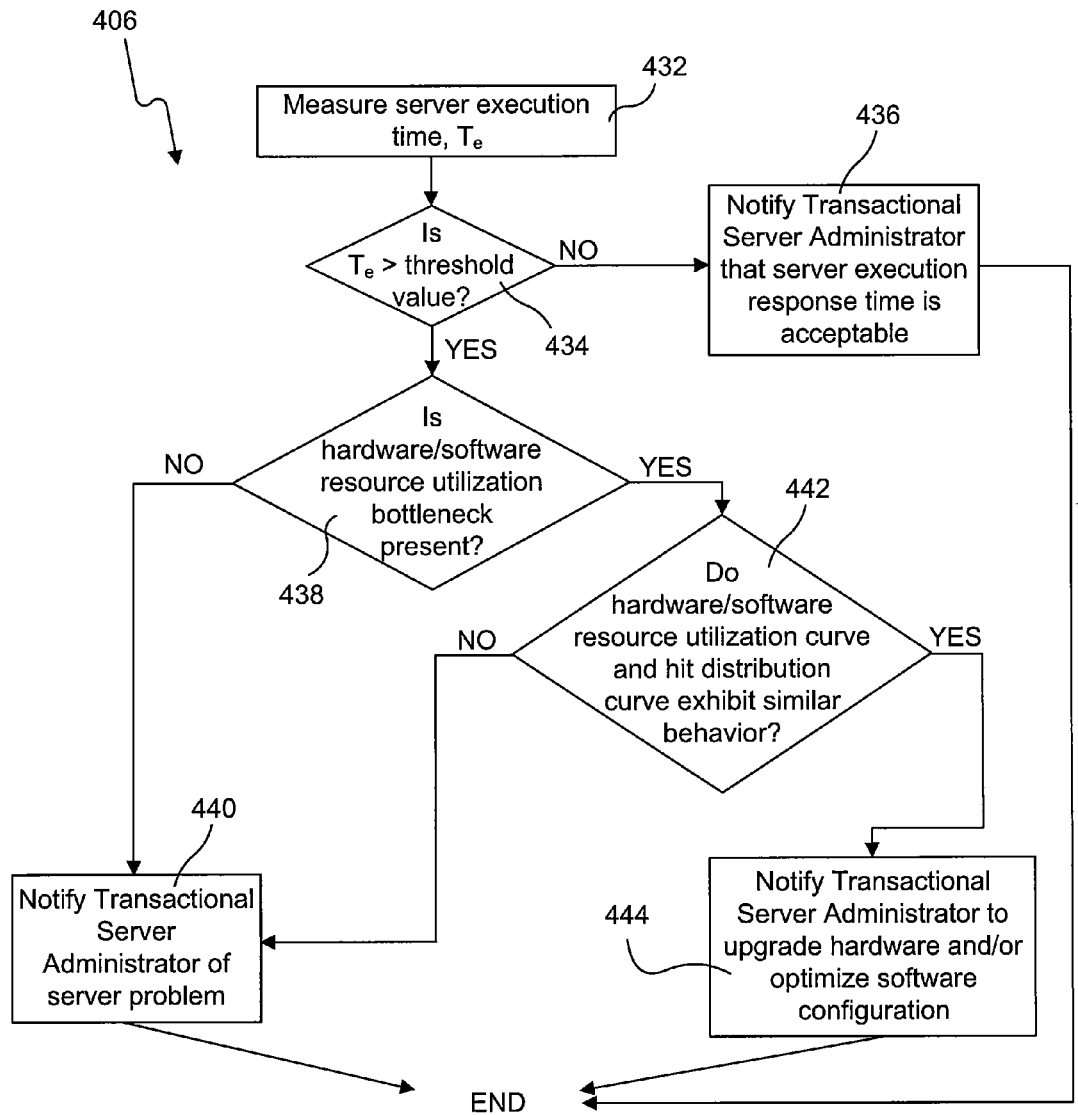
FIG. 8 is a flow chart of a further part of the monitoring method of FIG. 6.

The network time Tn and the server response time Te are indexes of the performance of the client-server architecture 1, that may be used by the controller 70c for distinguishing network-related problems from server-related problems or even from client-related problems, as it will be better described in the flow charts shown in FIGS. 6-8.

With reference to the flow-chart of FIG. 6 in a step 400 a sequence of request to be emulated is identified by the controller 70c and the agent component measurements are started up. In a step 402 the controller 70c interrogates the agent component 70a and the log extractor 70b to collect, for each emulated request, respectively the measured server execution time Te and the Time Taken field 124.

In a step 404 the average network time Tn behavior, for example over one hour, is determined and the network performance is evaluated (as will be setter described in the following).

In a step 406 the average server execution time Te behavior trend, for example over an hour, is determined and the server performance is evaluated (as will be better described in the following).

In a step 408 the network and server performances are analyzed. If the network and server performances are OK the method continues with step 410, otherwise the method continues with step 412.

In the step 410 information on overall performances OK is given to the transactional server administrator.

In the step 412 information on bad overall performances is given to the transactional server administrator: there are network or/and server problems.

In both cases the method can be continued with step 414. In this step, the controller 70c can refine the identified sequence of requests, using the criteria above described, and come back to the beginning.

FIG. 7 shows in detail a possible use of the network time Tn for monitoring network-related problems or problems related to bad application access link or single end-user terminal 20. In detail, in a step 416 the network time Tn related to all the IP addresses with the same kind of request is calculated. In a step 418 it is verified if all (or a substantial portion of) the monitored IP addresses have optimal performance. Optimal performance of all (or a substantial portion of) the monitored IP addresses can be verified, for example, by comparing the network time Tn calculated for each monitored IP addresses with a threshold value (for example 2 s). If all (or a substantial portion of) the monitored IP addresses have a related network time Tn below the threshold value the method continues with step 420, otherwise it continues with step 422. In step 420 information on network performance OK is given to the transactional server administrator. In step 422 it is verified if all the monitored IP addresses have bad performance, for example by comparing the network time Tn calculated for each monitored IP addresses with the threshold value. If all (or a substantial portion of) the monitored IP addresses have a respective network time Tn above the threshold value, information on bad application access link is given to the transactional server administrator in the step 424.

If this condition in not verified for all the IP addresses, the method continues with step 426. In the step 426 it is verified if there are IP addresses, near the IP addresses having bad performance, with the same bad performance i.e with a respective network time Tn above the threshold value. For the purpose of the present invention, by the expression "near", it is to be intended that the IPs can be located in the same subnet or network or LAN of the IP addresses having bad performance.

If this condition is false the method continues with step 428 where a single end-user terminal problem is recognized and a notification message is sent to the transactional server administrator.

If the condition of having "near" IP addresses with bad performance is true, the method continues with step 430. In the step 430 information on network problem is given to the transactional server administrator.

FIG. 8 shows in detail a possible use of the server response time Te for monitoring server-related problems. In a step 432 the server execution time Te for a specific emulated request is measured by the agent component 70a. In a step 434 it is verified if the server execution time Te is above a threshold value (for example 8 s). If this condition is false the method continues with step 436, otherwise it continues with step 438. In the step 436, information of server execution response time OK is given to the transactional server administrator.

In the step 438 it is verified if some bottleneck is present on the hardware/software resource utilization on the web server component 40a/application servers 40b or the back-end databases 60. If this condition is false the method continues with step 440, otherwise it continues with step 442. In the step 440 information on server (application) problem is given to the transactional server administrator (for example a wrong configuration may have occurred). In a step 442 it is verified if the curves representing the hardware/software resource utilization and respectively the hit distribution have the same behavior. If this condition is false the method continues with step 440, otherwise it continues with step 444. In the step 444, an indication to upgrade the hardware and optimize the software configuration of the transactional server 40 is given to the transactional server administrator.

The arrangement described herein has the following advantages.

Firstly, it permits to monitor performance of a client-server architecture without adding network traffic.

Moreover, through a single installation of an agent component near the transactional server to be monitored, it is possible to keep under detailed monitoring all the client-server architecture, including performances of all the clients using the transactional server, in a non intrusive and easy way (e.g. not modifying any client request code).

Finally, it is clear that numerous modifications and variations may be made to the arrangement described herein, all falling within the scope of the inventive concept, as defined in the attached claims.

For example, the present invention can also be applied to non web-based servers provided that they are associated to a log file having a format essentially similar to the log record shown in FIG. 3.

Additionally, the end-user can set a Service Level Agreement (SLA) on each request and choose a relevant action (e.g. sending an e-mail, . . . ) if the SLA is not met. The SLA can be set on the hit e2e response time or on the network time or on the server execution time. In this case, the information on the SLA not being met is transmitted by the monitoring system to the end user concerned.

Figure 9:
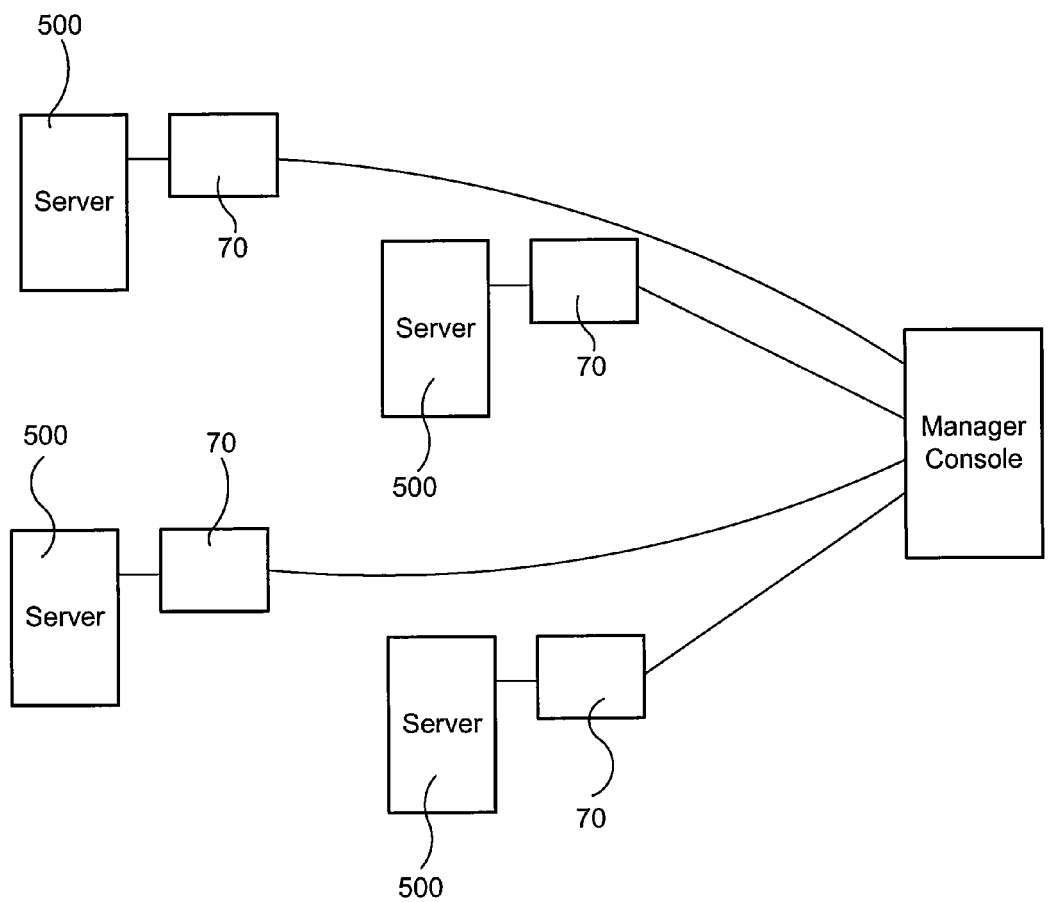
FIG. 9 shows an exemplary application of the invention described herein.

The arrangement described herein can also be used in a more general data centre monitoring system, as shown in FIG. 9, to identify and distinguish server-related problems from network-related problems.

This data centre monitoring system can be based on a manager/server architecture where servers 500 are monitored by a manager console 501 able to collect data about the behavior of the servers 500 (hardware resource utilization, network connectivity, availability) for providing a very deep analysis of the server architectures performances.

According to the present invention, a system 70 can be installed near or on one or more server 500 to be monitored.

Thanks to its functionalities, the system 70 is able to:

send alarms if e2e response times will exceed a defined warning threshold (characterizing between under-powered HW, network problems, network overload and server overload;

send alarms if network times (intranet/extranet) is above a threshold value (for example eight seconds);

provide a better detailed information about server performance behavior in relation to the user load.

The invention claimed is:

1. A computer-implemented method for monitoring performance of client-server architecture comprising a client-side portion and a server-side portion connected together via a network, said client-side portion comprising at least one end-user terminal and said server-side portion comprising at least a server component, comprising:

accessing a log file maintained in said server component to identify a set of end-user terminal requests to be emulated in terms of at least one of the size, server execution time, and cache location of the result associated with each request;

emulating and sending to said server component at least one end-user terminal request by means of an agent component installed in said server-side portion;

processing at said server component said at least one emulated request and generating a corresponding result;

measuring a server execution time indicative of the time elapsed between reception of said emulated end-user request at said server component and generation of a result of said emulated end-user request at said server component;

extracting from the log file maintained in said server component an entry that includes a measurement representative of the time elapsed from when a request sent by said end-user terminal to said server component is received by said server component until an acknowledgment, indicating that a result of said request reaches said end-user terminal, is received by said server component, said measurement being an approximation of a hit response time, said hit response time being the time elapsed from when the end-user terminal sent a request to said server component until the result of said request reaches said end-user terminal; and determining for said at least one emulated request a network delay introduced by the network from said server execution time and said measurement.

2. The method according to claim 1, wherein determining for each emulated request a network delay comprises using said network delay and said server execution time for monitoring performance of said client-server architecture by distinguishing network-related problems from server-related problems.

3. The method according to claim 1, wherein said server execution time measured by said agent component is the time elapsed between the instant in which the agent component sends the emulated request to said server component and the instant in which said agent component receives the result of said emulated request.

4. The method according to claim 2, wherein using said network delay and said server execution time for monitoring performance of said client-server architecture comprises:

providing a first threshold value;

comparing said network delay with said first threshold value; and giving information on network-related problems if said network delay is above said first threshold value.

5. The method according to claim 2, wherein using said network delay and said server execution time for monitoring performance of said client-server architecture comprises:

providing a second threshold value;

comparing said server execution time with said second threshold value; and giving information on server-related problems if said server execution time is above said second threshold value.

6. The method according to claim 1, wherein emulating end-user terminal requests comprises installing said agent component in a host computer located near said server component.

7. The method according to claim 1, wherein emulating end-user terminal requests comprises installing said agent component on said server component.

8. A system for monitoring performance of client-server architecture comprising a client-side portion and a server-side portion connected together via a network, said client-side portion comprising at least one end-user terminal and said server-side portion comprising at least a server component, comprising:

at least an agent component installed in said server-side portion, said agent component being configured for:

accessing a log file maintained in said server component to identify a set of end-user terminal requests to be emulated in terms of at least one of the size, server execution time, and cache location of the result associated with each request;

emulating and sending to said server component at least one end-user terminal request, said at least one emulated request comprising processing at said server component for generating a corresponding result; and measuring a server execution time indicative of the time elapsed between reception of said emulated end-user request at said server component and generation of a result of said emulated end-user request at said server component;

at least a log extractor configured to produce with said server component the log file comprising an entry that includes a measurement representative of the time elapsed from when a request sent by said end-user terminal to said server component is received by said server component until an acknowledgment, indicating that a result of said request reaches said end-user terminal, is received by said server component, said measurement being an approximation of a hit response time, said hit response time being the time elapsed from when the end-user terminal sent a request to said server component until the result of said request reaches said end-user terminal; and at least a controller configured for:

determining for said at least one emulated request a network delay introduced by the network from said server execution time and said measurement.

9. The system according to claim 8, wherein said controller is configured for using said network delay and said server execution time for monitoring performance of said client-server architecture by distinguishing network-related problems from server related problems.

10. A client-server architecture comprising a client-side configuration and a server-side configuration connected together via a network, said client-side configuration comprising a plurality of end-user terminals and said server-side configuration comprising a server component, said client-server architecture being associated with a system according to claim 8.

11. A non-transitory computer-readable medium, the computer-readable medium having computer-executable instructions that, when executed by a processor of at least one computer configure the at least one computer to perform the method of claim 1.

12. A computer-implemented method for monitoring performance of client-server architecture comprising a client-side portion and a server-side portion connected together via a network, said client-side portion comprising at least one end-user terminal and said server-side portion comprising at least a server component, comprising:

accessing a log file maintained in said server component to identify a set of end-user terminal requests to be emulated in terms of at least one of the size, server execution time, and cache location of the result associated with each request;

sending to said server component at least one end-user terminal request;

processing at said server component said at least one request and generating a corresponding result;

measuring by means of an agent component installed in said server-side portion a server execution time indicative of the time elapsed between reception of said end-user request at said server component and generation of a result of said end-user request at said server component;

extracting from the log file maintained in said server component, an entry that includes a measurement representative of the time elapsed from when a request sent by said end-user terminal to said server component is received by said server component until an acknowledgment, indicating that a result of said request reaches said end-user terminal, is received by said server component, said measurement being an approximation of a hit response time, said hit response time being the time elapsed from when the end-user terminal sent a request to said server component until the result of said request reaches said end-user terminal; and determining for said at least one request a network delay introduced by the network from said server execution time and said measurement.

13. A system for monitoring performance of client-server architecture comprising a client-side portion and a server-side portion connected together via a network, said client-side portion comprising at least one end-user terminal and said server-side portion comprising at least a server component, comprising:

at least an agent component installed in said server-side portion, said agent component being configured for:

accessing a log file maintained in said server component to identify a set of end-user terminal requests to be emulated in terms of at least one of the size, server execution time, and cache location of the result associated with each request;

sending to said server component at least one end-user terminal request, and said least one end-user terminal request comprising processing at said server component for generating a corresponding result; and measuring a server execution time indicative of the time elapsed between reception of said end-user request at said server component and generation of a result of said end-user request at said server component;

at least a log extractor configured to produce with said server component the log file comprising an entry that includes a measurement representative of the time elapsed from when a request sent by said end-user terminal to said server component is received by said server component until an acknowledgment, indicating that a result of said request reaches said end-user terminal, is received by said server component, said measurement being an approximation of a hit response time, said hit response time being the time elapsed from when the end-user terminal sent a request to said server component until the result of said request reaches said end-user terminal; and at least a controller configured for:

determining for said at least one request a network delay introduced by the network from said server execution time and said measurement.

\* \* \* \* \*